United States Patent
Edholm et al.

(10) Patent No.: US 8,582,595 B2
(45) Date of Patent: Nov. 12, 2013

(54) ACTIVATION OF CODE MULTIPLEXING

(75) Inventors: Christer Edholm, Täby (SE); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

(21) Appl. No.: 12/936,922

(22) PCT Filed: Mar. 17, 2009

(86) PCT No.: PCT/SE2009/050272
§ 371 (c)(1),
(2), (4) Date: Nov. 8, 2010

(87) PCT Pub. No.: WO2009/126091
PCT Pub. Date: Oct. 15, 2009

(65) Prior Publication Data
US 2011/0044456 A1    Feb. 24, 2011

(30) Foreign Application Priority Data
Apr. 10, 2008  (EP) .................................. 08154324

(51) Int. Cl.
*H04B 7/216* (2006.01)

(52) U.S. Cl.
USPC .......................................... 370/441; 380/287

(58) Field of Classification Search
USPC ............... 380/287; 370/229–231, 441, 455; 375/141
See application file for complete search history.

(56) References Cited

U.S. PATENT DOCUMENTS

| 6,625,136 | B1 * | 9/2003 | Niegel et al. | 370/335 |
| 2002/0045448 | A1 * | 4/2002 | Park et al. | 455/436 |
| 2005/0232140 | A1 * | 10/2005 | Proctor et al. | 370/208 |
| 2007/0104085 | A1 | 5/2007 | Sambhwani et al. | |
| 2007/0109964 | A1 * | 5/2007 | Kwak et al. | 370/230 |
| 2009/0073939 | A1 * | 3/2009 | Panico | 370/335 |

FOREIGN PATENT DOCUMENTS

EP    1179962  A2    2/2002

OTHER PUBLICATIONS

Author Unknown. "Database WIP Week 200279." Thomson Scientific, London, GB, 2002-729572, Jun. 8, 2002.
Camero, J. O. et al. "Capacity Gain of an Uplink-Synchronous WCDMA System Under Channelization Code Constraints." IEEE Transactions on Vehicular Technology, vol. 53, No. 4, Jul. 2004.

* cited by examiner

*Primary Examiner* — Linglan Edwards
*Assistant Examiner* — Tracy Mangialaschi
(74) *Attorney, Agent, or Firm* — Coats and Bennett, P.L.L.C.

(57) ABSTRACT

The present invention relates to a system and a method for transmitting data between a first terminal and a communication network access point. The method may comprise the steps of defining a first set of scrambling codes and a second set of scrambling codes different from the first set of scrambling codes. Further, the method may comprise defining a first selection scheme for a first parameter. The method may still further comprise determining a current parameter value for the first parameter and evaluating the current parameter value on the basis of the first selection scheme and selecting a scrambling code from the first set of scrambling codes or the second set of scrambling codes based on the evaluation. Even further, the method may comprise packaging and transmitting data between the first terminal and the communication network access point using the selected scrambling codes.

16 Claims, 3 Drawing Sheets

ACTIVATION OF CODE MULTIPLEXING

TECHNICAL FIELD

The present invention relates to a method of improving data transmission in data communication, in particular in wireless data communication. The wireless data communication may include mobile data communication. The invention also relates to an apparatus for such communication and a computer program product for controlling such communication.

BACKGROUND

In recent years, there has been a development in wireless communication technology and an increase in the number of subscribers leading to a substantial increase in data traffic. Furthermore, new applications such as gaming, music downloads, video transmission etc require an increase in transmission bandwidth. One technology used for wireless data transmission is WCDMA.

WCDMA—Wideband Code Division Multiple Access—was developed, at least partly, to ensure global roaming capabilities by setting a global standard for real-time multimedia services. The standard was initially supported by the International Telecommunication Union, ITU, and was later taken over by $3^{rd}$ Generation Partnership Project, 3GPP.

The general idea is to allow multiple terminals to share a common channel. There are several widely used techniques, including Frequency Division Duplex or Frequency Division Multiplex, Time Division Duplex or Time Division Multiplex and Code Division Multiplex. For multiple access techniques include TDMA, FDMA and CDMA, i.e. Code Division Multiple Access, CDMA and Wideband Code Division Multiple Access, WCDMA. The multiple access methods allow resources to be divided between different users, the duplex/multiplex methods are used to divide resources to provide two-way communication. The methods may be combined, e.g. in GSM where TDMA is mixed with FDMA so that users are allocated different timeslots and in order to accommodate more users, FDMA is used, allowing several frequencies to be used.

In Frequency Division Duplex, a frequency is divided into a number of sub-bands where each terminal is allocated a given sub-band. This requires good frequency filtering. Examples of technology using Frequency Division Duplex include HSPA/HSDPA, High Speed Packet Access/High Speed Downlink Packet Access.

In Time Division Duplex, one channel is divided into a number of time slots where a given unit is allowed to transmit in a limited number of time slots. This requires that all terminals are synchronized. Examples of systems using Time Division Duplex include WiMAX and TDSCDMA.

In CDMA systems all users, i.e. terminals, transmit within the same bandwidth simultaneously. The individual data is related to a specific user via codes in the data.

In uplink multiplexing today, each terminal has its own non-orthogonal scrambling code.

In case of synchronous transmission, several terminals may share a common scrambling code and terminal multiplexing will be carried out through assigning different orthogonal spreading codes to different terminals. To share a common scrambling code the terminals are required to be synchronized. To maintain the orthogonality in the uplink, all (active) terminals need to be synchronized in the sense that the signals from different terminals should reach the base station at the same time. Similarly to the downlink, it can be expected that different channels belonging to the same terminal are also code multiplexed. Hence, data and control signaling may be allocated to different spreading codes and transmitted simultaneously.

One problem that will occur when several terminals share the same scrambling code in the uplink is that the system may become code limited. Each terminal or user needs a number of spreading codes for control purposes. This will happen regardless if the terminal has any data to transmit or not. Also, for simplifying signaling it is likely that a fixed amount of the now common code resource has to be allocated for this use. Hence, supporting a large number of users will require a large amount of the common code resource just for control purposes and fewer codes will be available for data transmission.

US Patent publication No. 2007/0104085 discloses a method of varying scrambling code in which a scrambling code can be allocated to a user device in dependence of detected interference. Two different scrambling code sequence sets may be employed for increasing variation of scrambling codes to increase interference diversity and reduce a jamming effect caused bo a dominant interferer in a sector near an interfered user's sector.

Mogensen, P. E. et al.: "Capacity Gain of an Uplink-Synchronous WCDMA System Under Channelization Code Constraints" IEEE Transactions on Vehicular Technology, IEEE Service Center, Piscataway, N.J., US, vol. 53, No. 4, 1 Jul. 2004 (Jul. 1, 2004), pages 982-991, XP011115281, ISSN 00188-9545 discloses the use of more than one set of scrambling codes to increase the number of available scrambling codes.

It is an object of the present invention to provide a method and system to provide improved support for multiple terminals.

SUMMARY

The above object, along with other objects and advantages, is provided by a first aspect of the present invention by a method for transmitting data between a first terminal and a communication network access point.

The method may comprise the steps of defining a first set of scrambling codes and a second set of scrambling codes different from the first set of scrambling codes. Further, the method may comprise defining a first selection scheme for a first parameter. The method may still further comprise determining a current parameter value for the first parameter and evaluating the current parameter value on the basis of the first selection scheme and selecting a scrambling code from the first set of scrambling codes or the second set of scrambling codes based on the evaluation. Even further, the method may comprise packaging and transmitting data between the first terminal and the communication network access point using the selected scrambling codes.

If all users in the system should have its control channels within the common scrambling code, very few codes will be available for data transmission. This in turn will limit the potential data rate of a synchronous UL system. The method according to the teachings of the present invention is contemplated to overcome this problem and provide a better utilization of bandwidth.

The network access point is contemplated to be a wireless access station, such as a base station for mobile phone communication or a base station for wireless communication to routers and modem etc. Further, the first terminal may be a mobile telephone, a PDA, a modem for a computer, a communication device built into a computer, a router or any combinations thereof.

The steps of determination of the scrambling codes may be performed as an initial step, e.g. during setup of a network access point, or may be determined by a standard and preloaded into a network access point. Alternatively, the scrambling codes may be determined at several instances while the network access point is operating. The selection scheme may be changed over time, or in the alternative defined once, e.g. during start up. The scheme may originate from a standard, e.g. defined by 3GPP.

Preferably the step of comparing the current parameter value to the first selection scheme may be performed in the network access point. This is contemplated to be advantageous as the network is then able to maintain full control over a plurality of terminals in communication with a given network access point.

It is an advantage of the present invention that a signal indicating a shift from the selection of scrambling codes from the first scrambling code set to selection of scrambling codes from the second scrambling code set may be sent from the network access point to the first terminal. This is contemplated to allow a network access point to control the state of each specific terminal in contact with that network access point. Also, it is possible to obtain an overview of the state of every terminal in contact with a given network access point at any given time, without polling each unit or terminal.

It is a further advantage of the present invention that each terminal may select scrambling codes different from any other previously selected scrambling code. This may allow each terminal to use a unique scrambling code.

A still further advantage of the present invention is that the terminal may be in a first state where the terminal have data to transmit or in a second state where the terminal does not have any data to transmit, a first plurality of terminals being in the first state sharing a common scrambling code and a second plurality of terminals being in the second state where each have a unique scrambling code. This is contemplated to allow even better usage of bandwidth in the system.

An even further advantage of the present invention is that synchronization between the first terminal and the network access point may be established before any scrambling codes from the first set of scrambling codes are selected. When choosing scrambling codes from the first set, the user equipment, i.e. the terminals, share the same scrambling code and hence need to be synchronized. For the second set, the users may have different scrambling codes, and the terminals do not need to be synchronized.

In some embodiments of the present invention the scrambling codes of the first set of scrambling codes are associated with channels having a first spread factor, and the scrambling codes of the second set of scrambling codes are associated with channels having a second spread factor. Further, the first spread factor may be different from the second spread factor. In some advantageous embodiments, the first spread factor may be smaller than the second spread factor, or in the alternative that the first spread factor may be higher than the second spread factor. The specific relationship between the spread factors may depend on the overall system design and other factors.

In specific embodiments of the present invention the first spread factor and/or the second spread factor may have the value 4, 8, 16, 32, 64, 128 or 256. The specific choice may depend on the specific application and system.

Preferably, communication between the first terminal and the network access point may be based on WCDMA, but other protocols and standards may be used.

The first selection scheme may include a criterion and the step of evaluating the current parameter value may include comparing the current parameter value to the criterion. An example of such an embodiment includes an embodiment where the first parameter is data transmission rate and the criterion is a data transmission rate threshold. This is contemplated to be an advantageous way of determining if a terminal is, or should be, in the first or the second state.

Specifically, the data transmission rate threshold may be zero bytes per second. Alternatively, the data transmission rate threshold may be below 10 kb/sec.

In alternative advantageous embodiments, the selection first scheme may include status detection of buffers, detection of request, detection of happy bit, or any combinations thereof.

In presently preferred embodiments the network access point may be a mobile telephone base station, but as mentioned, other types of network access points may be used.

Further, the above object, along with other objects and advantages, is provided by a second aspect of the present invention by an apparatus for establishing and performing data transmission between the apparatus and a terminal. The apparatus may comprise a data storage, a data processor connected to the data storage, a communication device for establishing wireless communication with the terminal. Also, the apparatus may comprise a computer implementation of a method for transmitting data between the terminal and the apparatus. Further, the computer implementation may comprise the steps of defining a first set of scrambling codes, defining a second set of scrambling codes different from the first set of scrambling codes and defining a first selection scheme for a first parameter. The method may still further include determining a current parameter value for the first parameter and evaluating the current parameter value on the basis of the first selection scheme and selecting a scrambling code from the first set of scrambling codes or the second set of scrambling codes based on the evaluation. Also, the method may include packaging and transmitting data between the first terminal and the apparatus using the selected scrambling codes. Packaging of data occurs both in the terminal and in the network access point.

The computer implementation in the apparatus according to the second aspect of the present invention may further include implementation of any of the method steps of the method according to the first aspect of the present invention.

The first and the second aspect of the present invention is contemplated to at least provide the advantage of a better use of the code resource and hence, support for a greater number of terminals.

DETAILED DESCRIPTION

Figure 1:
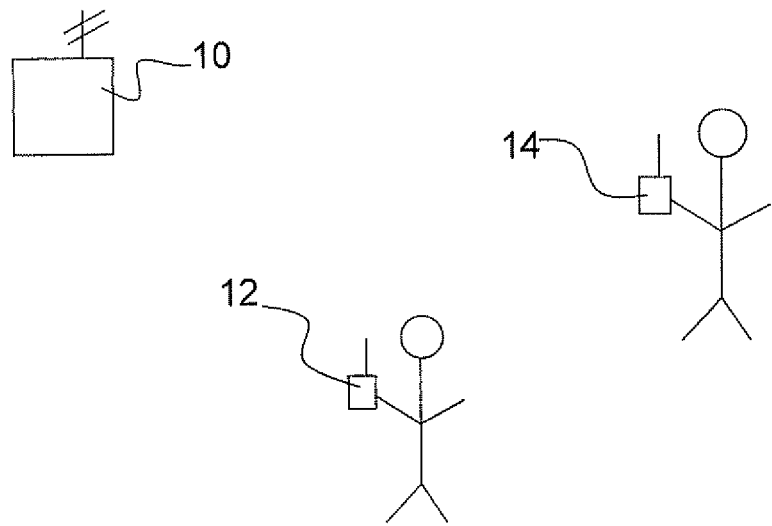
FIG. 1 is a schematic illustration of a base station a two terminals.

FIG. 1 is a schematic illustration of a base station 10 having a communication antenna 10a. The antenna 10a is adapted to communicate with one or more terminals 12 and 14, here illustrated as mobile or cellular phones. However, other wireless communication devices may be used for performing the method according to the present invention. Examples of suitable devices are a PDA, a modem, a router, e.g. for ADSL or xDSL, or any combinations thereof.

Figure 2:
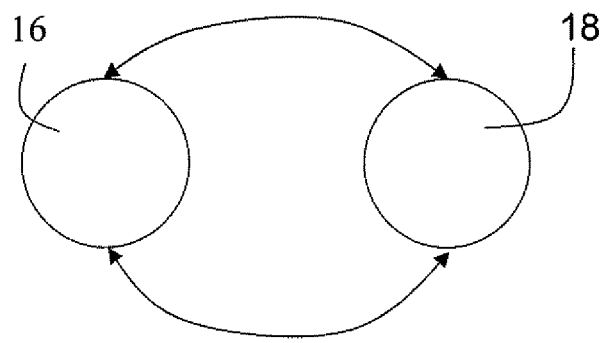
FIG. 2 is a schematic illustration of two states of a terminal.

As illustrated in FIG. 2, the terminal 12, 14 may be in one of two states 16, 18, namely a state 16 where the terminal has data to transmit and a state 18 where the terminal does not have any data to transmit, or only requires a low bandwidth, i.e. have a few data to transmit. The level of data to transmit may be determined using a threshold value, as is discussed elsewhere in the specification. In the current specification of WCDMA each user has its own scrambling code, and since the scrambling codes are non-orthogonal, each new code will contribute to the total UL interference, i.e. limit the capacity.

One way to increase the number of devices or terminals 12, 14 that may be supported by a given base station 10 is through a better usage of the code resources, which the method according to the teachings of the present invention provides.

Figure 3:
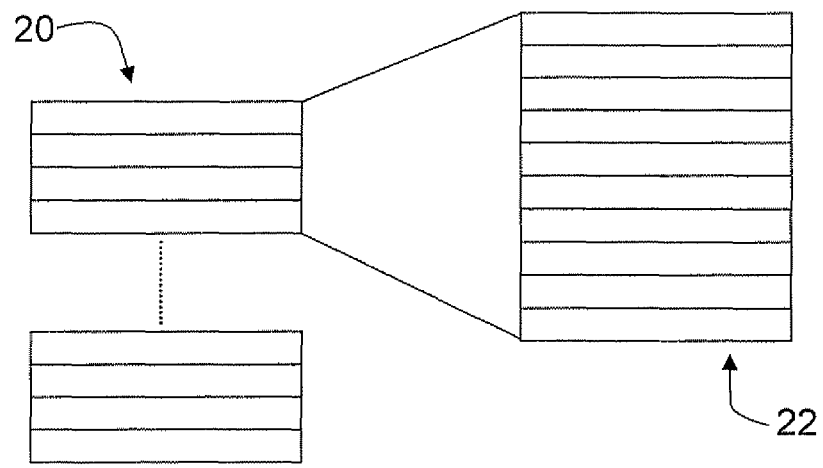
FIG. 3 is a schematic illustration of data/channel structure.

FIG. 3 schematically illustrates data/control channel structure of the method according to the present invention.

It is assumed that a similar code structure is adopted for a synchronous UL transmission scheme as used in HSDPA. Hence, a fixed spreading factor (SF) is defined, e.g. SF=16, and users are allocated a number of codes for the data transmission in UL. One, or a few, of the codes are not used for data transmission but allocated for control signaling.

In the example illustrated in FIG. 3, one channelization code 20 is used for control, while 15 codes are allocated to data transmission. Different users may be multiplexed in the code domain.

In the particular example illustrated in FIG. 3, control channels 22 are allocated to a SF=128, so that up to 16 users can be in an "active" state.

When a user has no, or little, data to transmit the terminal is allocated its own scrambling code and another user or terminal having more data to transmit may be moved into the common scrambling code. Advantageously, a threshold value is defined to determine when a terminal is in one state or the other.

At the point when users or terminals are relocating from their own scrambling code to the common scrambling code, the terminals control channels will be allocated to one of the control codes.

The decision to move a user is made by the network, e.g. by a network access point. Many different criterions may be defined, some already present in the current version of the specification. Examples include buffer status, scheduling requests and the "happy bit".

Figure 4:
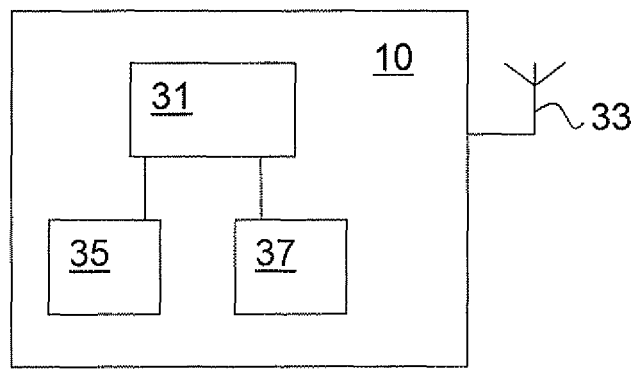
FIG. 4 is a schematic illustration of an embodiment of a base station.

FIG. 4 shows schematically a logical view of an embodiment of the base station 10 of FIG. 1. Only the components relevant to the invention are shown. As will be understood, the base station also comprises all relevant parts to perform its normal functions in the network, as known in the art. The base station 10 comprises a processor 31 for controlling the function of the base station. The base station 10 also comprises a communication device 33 for establishing wireless connection with the terminals 12, 14 in the network. In FIG. 4, the communication device 33 is illustrated as an antenna. As will be understood, the communication device also comprises one or more logical units within the base station for performing various functions such as encoding and interleaving. These are well known in the art and will not be discussed here.

The base station 10 also comprises a first memory unit 35 connected to the processor 33 and comprising a first and a second set of scrambling codes which will be discussed in more detail in connection with FIG. 5. A second memory unit comprises a computer program product comprising computer-readable code means arranged to be run in the processor 31. When run in the processor, the computer program product will make the processor perform the inventive method, for example according to FIG. 5.

Figure 5:
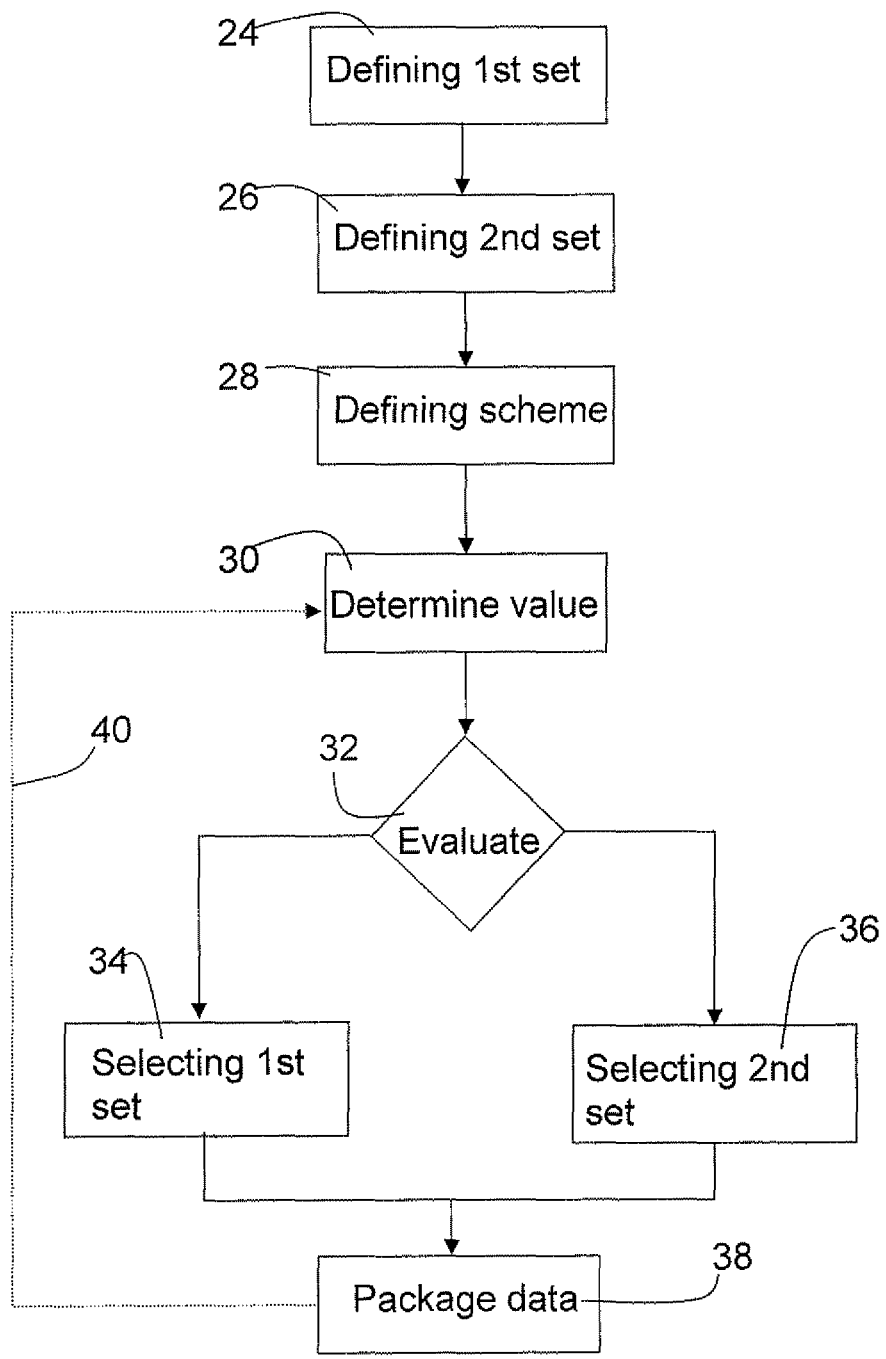
FIG. 5 is a schematic illustration of a flow diagram.

FIG. 5 is a schematic illustration of one embodiment of the method according to the present invention.

A first set of scrambling codes 20 is defined 24. Further, a second set of scrambling codes (22) different from the first set of scrambling codes (20) are defined 26. A first selection scheme for a first parameter is defined 28. This is used for determining if a given terminal is or should be in one of the two states 16 and 18.

While a terminal is in communication with a network access point a current parameter value for the first parameter is determined 30. The current parameter value is evaluated 32 on the basis of the first selection scheme and a scrambling code from the first set of scrambling codes 20 or the second set of scrambling codes 22 is selected at 34 and 36, respectively, based on the evaluation 32.

The network (base station) also needs to inform the terminal or terminals about the selection so that the correct scrambling code is used. This may be done by using some form of control signaling.

Then data is packaged and transmitted 38 between the first terminal 12, 14 and the communication network access point 10 using the selected scrambling code or codes.

Finally, the method may run in a loop, as indicated by the arrow 40.

The invention claimed is:

1. A method for transmitting data between a plurality of wireless terminals and a communication network access point in a wireless communication network, the method comprising:

defining a first set of scrambling codes;

defining a second set of scrambling codes different from the first set of scrambling codes;

determining whether a given one of the wireless terminals is in a first state where the wireless terminal has data to transmit or is in a second state where the wireless terminal does not have any data to transmit;

selecting a scrambling code for the given wireless terminal from either the first set of scrambling codes or the second set of scrambling codes based on its determined state; and packaging and transmitting data between the given wireless terminal and the communication network access point using the selected scrambling code;

wherein the selecting comprises:

selecting a common scrambling code from the first set of scrambling codes in response to determining that the given wireless terminal is in the first state; and selecting a unique scrambling code from the second set of scrambling codes in response to determining that the given wireless terminal is in the second state; and wherein the access point supports the plurality of wireless terminals in the wireless communication network.

2. The method of claim 1, wherein a signal indicating a shift from the selection of a scrambling code from the first scrambling code set to selection of a scrambling code from the second scrambling code set is sent from the network access point to the given wireless terminal.

3. The method of claim 1, wherein synchronization between the given wireless terminal and the network access point is established before any scrambling codes from the first set of scrambling codes are selected.

4. The method of claim 1, wherein the scrambling codes of the first set of scrambling codes are associated with channels having a first spread factor, and the scrambling codes of the second set of scrambling codes are associated with channels having a second spread factor.

5. The method of claim 4, wherein the first spread factor is different from the second spread factor.

6. The method of claim 4, wherein the first spread factor is either smaller than the second spread factor or is higher than the second spread factor.

7. The method of claim 4, wherein the first spread factor, the second spread factor, or both, are 4, 8, 16, 32, 64, 128, or 256.

8. The method of claim 1, wherein communication between the given wireless terminal and the network access point is based on Wideband Code Division Multiple Access (WCDMA).

9. The method of claim 1, wherein determining whether the given one of the wireless terminals is in the first state or the second state includes evaluating a current parameter value by comparing the current parameter value to a criterion.

10. The method of claim 9, wherein the parameter is data transmission rate and the criterion is a data transmission rate threshold.

11. The method of claim 10, wherein the data transmission rate threshold is zero bytes per second.

12. The method of claim 1, wherein determining whether the given one of the wireless terminals is in the first state or the second state includes status detection of buffers, detection of a request, detection of a happy bit, or any combination thereof.

13. The method of claim 1, wherein the given wireless terminal is a mobile telephone, a Portable Digital Assistant (PDA), a modem for a computer, a communication device built into a computer, a router, or any combination thereof.

14. The method of claim 1, wherein the network access point is a mobile telephone base station.

15. A computer program product comprising computer instructions stored in a memory and which, when executed in an apparatus for establishing and performing data transmission between the apparatus and a plurality of wireless terminals in a wireless communication network will cause the apparatus to:
    determine whether a given one of the wireless terminals is in a first state where the wireless terminal has data to transmit or is in a second state where the wireless terminal does not have any data to transmit;
    select a scrambling code for the given wireless terminal from either a first set of scrambling codes or a second set of scrambling codes different from the first set of scrambling codes, based on its determined state; and
    package and transmit data between the given wireless terminal and the apparatus using the selected scrambling code;
wherein the scrambling code selection comprises:
    selecting a common scrambling code from the first set of scrambling codes in response to determining that the given wireless terminal is in the first state; and
    selecting a unique scrambling code from the second set of scrambling codes in response to determining that the given wireless terminal is in the second state; and
wherein the apparatus supports the plurality of wireless terminals in the wireless communication network.

16. An apparatus for establishing and performing data transmission between the apparatus and a plurality of wireless terminals in a wireless communication network, the apparatus comprising:
    a data processor;
    a communication device for establishing wireless communication with the plurality of wireless terminals;
    a first memory unit connected to the processor and having a first set of scrambling codes, and a second set of scrambling codes different from the first set of scrambling codes; and
    a second memory unit connected to the processor and having a computer program product which when run in the processor will cause the apparatus to:
    determine whether a given one of the wireless terminals is in a first state where the wireless terminal has data to transmit or is in a second state where the wireless terminal does not have any data to transmit;
    select a scrambling code for the given wireless terminal from either the first set of scrambling codes or the second set of scrambling codes based on its determined state;
    package and transmit data between the given wireless terminal and the apparatus using the selected scrambling code;
wherein the scrambling code selection comprises:
    selecting a common scrambling code from the first set of scrambling codes in response to determining that the given wireless terminal is in the first state; and
    selecting a unique scrambling code from the second set of scrambling codes in response to determining that the given wireless terminal is in the second state;
wherein the apparatus supports the plurality of wireless terminals in the wireless communication network.

\* \* \* \* \*